Patented Feb. 13, 1934

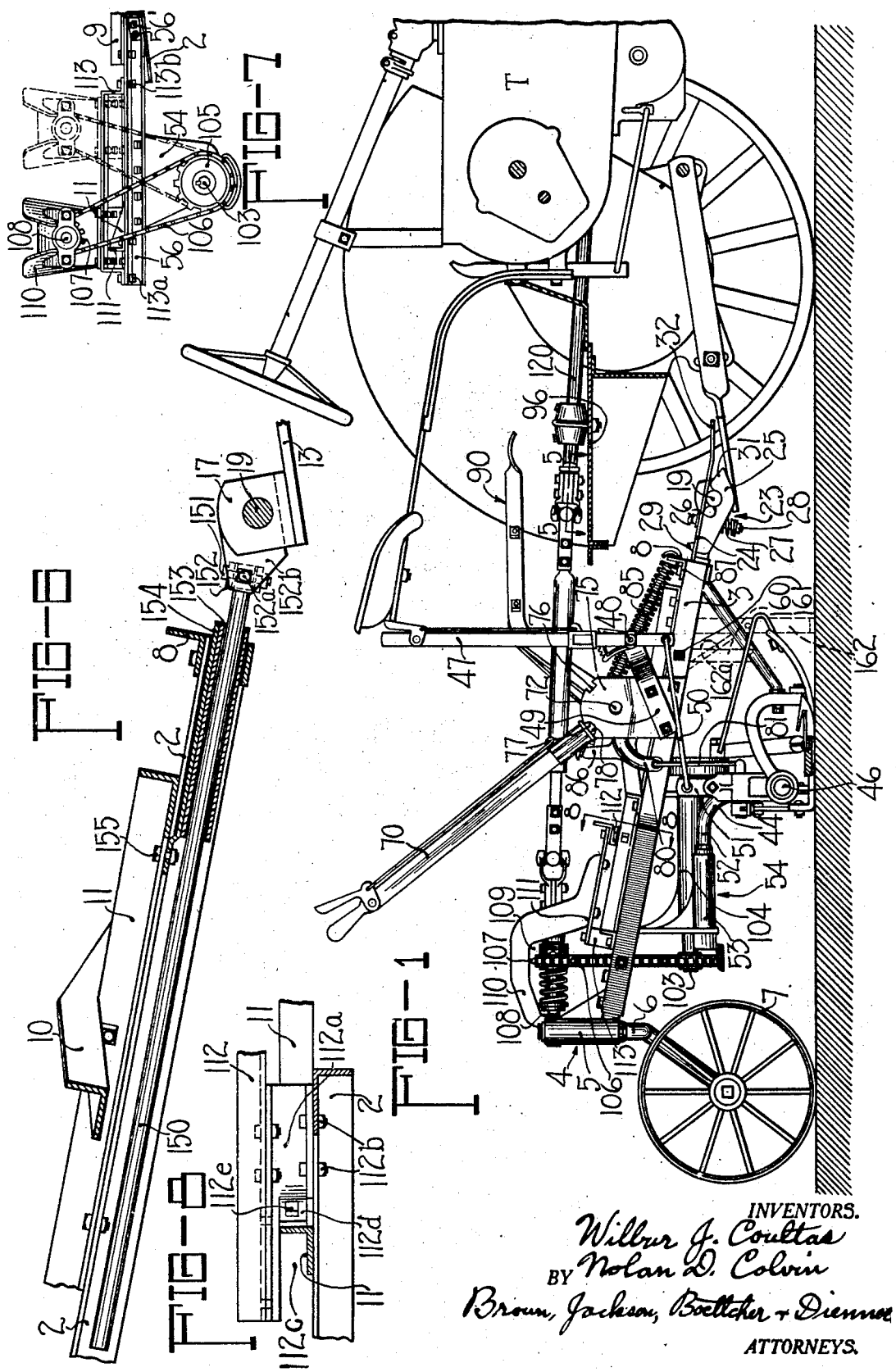

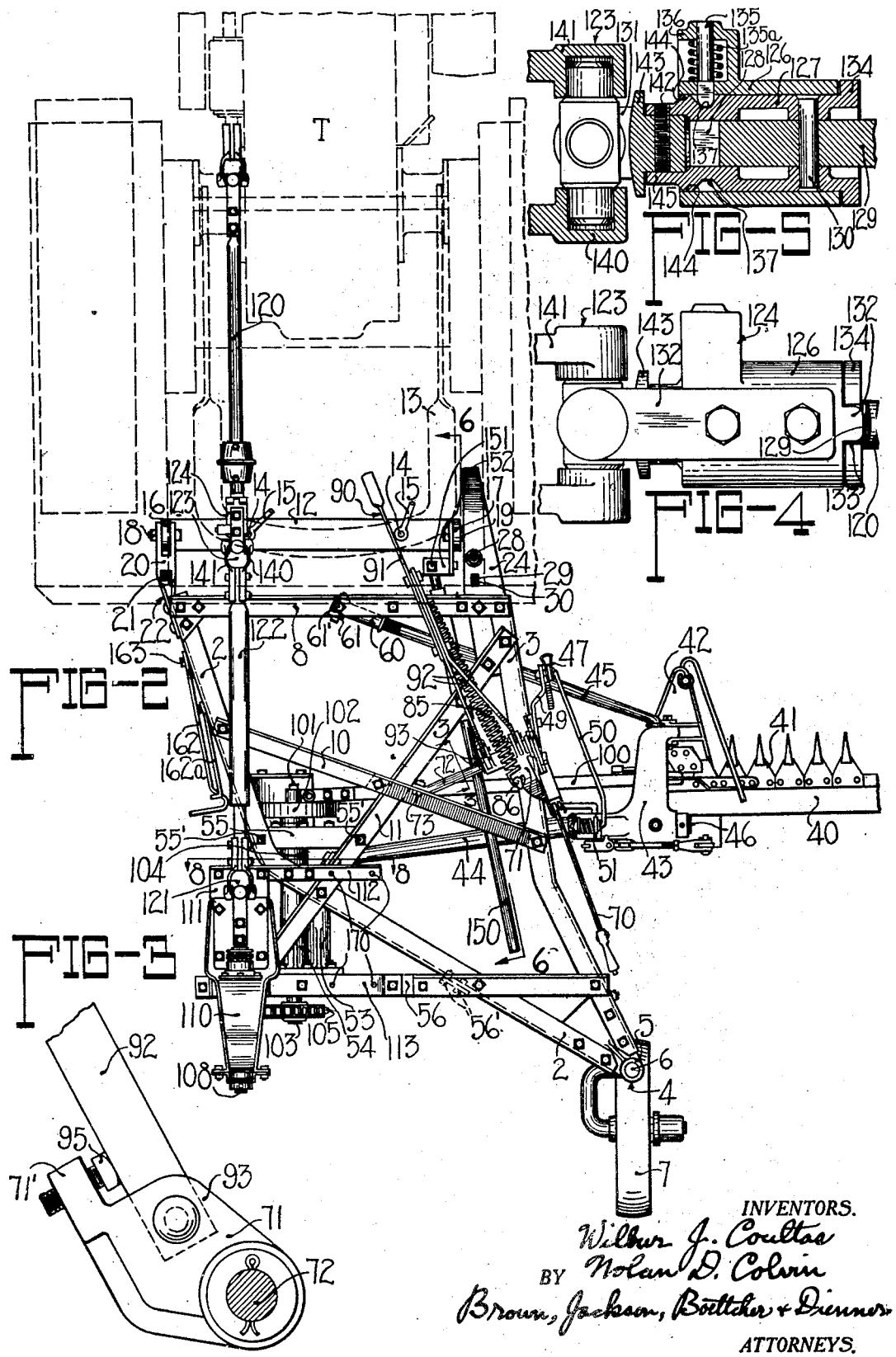

1,946,541

UNITED STATES PATENT OFFICE 1,946,541

MOWER

Wilbur J. Coultas and Nolan D. Colvin, Moline, Ill., assignors to Deere & Company, Moline, Ill., a corporation of Illinois Application May 3, 1933. Serial No. 669,141

21 Claims. (Cl. 56—25)

This invention relates to mowers, and more particularly to mowers of the type which are adapted to be connected to a tractor to be drawn thereby and in which the operating mechanisms of the mower are operated by power derived from the power take-off of the tractor. A mower of this general type is disclosed in the application of Talbert W. Paul, Serial No. 403,942, filed November 1, 1929, and, broadly speaking, the present invention is in the nature of an improvement upon the mower disclosed in said application.

The principal object of the present invention is to provide improved means for supporting the mower frame and attaching it to the tractor, including a supporting member and a universal joint connection and latch between the mower frame and the supporting member, whereby the mower may rise and fall with respect to the tractor and may move rearwardly about the vertical pivot of said universal joint connection when the latch is released by the mower striking an obstruction. The present invention also contemplates the provision of a caster wheel at the rear of the mower frame whereby the mower will follow the contour of the ground independently of the tractor when in operating position.

Another object of the invention is to provide improved means for supporting the mower when it is unlatched and swung to inoperative position and for guiding it back so that it may automatically be re-positioned by backing the tractor.

A further object of the invention is to provide improved means in the form of suitable supports on the frame whereby the drive shaft for driving the operating parts of the mower, which is driven from the power take-off of the tractor, may be positioned in either of two positions so that the mower may be attached to and used in conjunction with either a tractor having a power take-off shaft on the side or with one having a power take-off shaft in the longitudinal center line of the tractor.

A still further object of the invention is the provision of the fly-wheel shaft of the mower in a vertical plane substantially midway between the two positions of the drive shaft, whereby one driving connection is suitable for connecting said shafts when the drive shaft is in either of said positions.

A still further object of the invention is the provision of means for supporting the forward end of the mower when it is disconnected from the tractor, whereby re-connection of the mower to the tractor is greatly facilitated.

Other objects and advantageous features will be apparent from the following description of the invention taken in conjunction with the accompanying drawings, in which:

Figure 1 is a side elevational view of a mower, as seen from the cutter bar side, applied to a tractor which is shown fragmentarily in dotted lines;

Figure 2 is a top plan view of the mower as applied to the tractor;

Figure 3 is a sectional view on an enlarged scale taken substantially on the line 3—3 of Figure 2;

Figure 4 is a top plan view on an enlarged scale illustrating a disconnect clutch associated with one of the universal joint connections in the driving line from the power take-off of the tractor to the operating mechanisms of the mower;

Figure 5 is a sectional view through the parts shown in Figure 4, the same being taken on the line 5—5 of Figure 1;

Figure 6 is a sectional view on an enlarged scale illustrating the supporting and. guiding rod and its connections with the mower frame and supporting member;

Figure 7 is a fragmentary rear elevational view illustrating in full lines the driving connection between the driving shaft and the fly-wheel shaft of the mower when the driving shaft is connected with a power take-off at the side of a tractor, as illustrated in the instant application, and showing in dotted lines the driving connection between said parts when the driving shaft is connected with a power take-off positioned in or near the longitudinal center line of the tractor; and Figure 8 is a fragmentary sectional view on an enlarged scale taken substantially on the line 8—8 of Figure 1 and illustrating the manner in which one of the driving shaft supports is connected with the frame bars of the mower.

Referring now more particularly to the several figures of the drawings, the mower frame comprises a pair of members 2 and 3 in the form of angle bars which are suitably spaced apart at their forward ends and converge rearwardly, their rear ends being bolted to a casting 4. The casting 4 is provided with a vertically extending sleeve portion 5 formed integral therewith and which receives the vertical spindle 6 of a caster wheel 7. As shown in Figure 2, the frame members 2 and 3 are connected together by means of a forward transverse angle bar member 8, a rear transverse angle bar member 9, and a pair of diagonal braces in the form of angle bars 10 and 11.

The forward end of the mower frame is supported, as hereinafter described in detail, on a transversely extending member 12. The transverse supporting member 12 provides means for connecting the mower to the tractor and as shown it is rigidly connected to the U-shaped draw bar 13 of the tractor T by means of a pair of bolts 14 extending through aligned holes in the member 12 and the bar 13 and provided with wing nuts 15 whereby the transverse member 12 can be quickly and easily connected to and disconnected from the tractor, as will be readily understood. The transversely extending member 12 is provided with upwardly turned ends 16 and 17 extending at right angles to the main body portion thereof as shown in Figure 1, and said members are perforated to receive, respectively, a pivot bolt 18 and a pivot pin 19, which bolt and pin extend transversely of the implement in a horizontal plane in alignment with each other. The forward end of a forked member 20 is pivotally connected to the bolt 18, while at its rear end the member 20 carries a vertically disposed pivot bolt 21. Fixedly secured in any suitable manner to the forward end of the frame member 2 at the left hand front corner of the mower is a bracket 22 in the form of a strap extending forwardly from said frame member and looped around the vertical pivot bolt 21.

It will be seen from the foregoing that the horizontal pivot bolt 18, the member 20, the vertical pivot bolt 21 and the strap 22 provide, in effect, a form of universal joint connection between the mower frame and the supporting member 12, as the frame may swing both vertically and horizontally relative to the supporting member.

At its opposite side the frame of the mower is pivotally connected to the horizontal pivot pin 19 through the instrumentality of a latch mechanism 23. This latch mechanism 23 comprises a spring plate 24 fixedly connected at its rear end to the right hand front corner of the mower frame by any suitable means and extending forwardly therefrom. The spring plate 24 carries a latch member 25 which is in the form of a suitable casting having a semi-circular recess 26 in its top surface, as shown in Figure 1, to receive the pivot pin 19. The latch member 25 is yieldingly supported below the spring plate 24 by means of a spring 27 embracing a bolt 28 which is carried by the plate 24 and extends vertically through a suitable opening in the latch member 25, the upper end of the spring bearing against the lower face of the member 25, and the lower end of the spring bearing against a stop member carried by the bolt. The latch member 25 is provided with a vertically extending lug 29 at its rear end which projects upwardly through a slot 30 formed in the plate 24 which, together with the bolt 28, maintains the member 25 of the latch in proper position relative to the spring plate 24. The forward end of the latch member 25 is provided with a cam surface 31 to facilitate engagement of the pin 19 in the recess 26, as will be readily understood. The forward end portion 32 of the spring plate 24 is also bent upwardly to facilitate this operation.

The pivot pin 19 being in alignment with the pivot bolt 18, these two members define the horizontal transverse axis about which the mower swings in its rising and falling movements with respect to the tractor when in operation.

Should the cutter bar of the mower strike an obstruction when in operation, whereby said cutter bar is prevented from moving forward with the tractor and is forced to swing rearwardly relative to the tractor, a separation of the forward end of the latch member 25 and the spring plate 24 takes place, the pin 19 riding out of the recess 26 and the forward end of the plate 24 tending to flex upwardly while the member 25 is forced downwardly against the action of the spring 27. When the latch has been disengaged from the pivot pin 19, the mower is free to swing rearwardly about the vertical pivot bolt 21, as will be readily understood.

The cutting mechanism of the mower comprises a laterally extending cutter bar 40 which supports a reciprocating sickle 41, the cutter bar itself being supported on a shoe 42. The shoe 42 is pivotally connected to a shoe arch or yoke 43 so as to permit the cutter bar 40 and shoe 42 to swing relatively thereto in a transverse vertical plane, as is usual in mower constructions of this type. As shown in Figure 2, the shoe arch 43 is connected to the mower frame by means of a thrust or drag bar 44 and also by means of a rod or brace 45.

The drag bar 44 is provided with a horizontally extending portion 46 upon which the shoe arch 43 is journaled for rocking movement about a transverse axis to tilt the cutter bar. This rocking movement of the arch 43 is controlled by means of a tilting lever 47 pivotally connected at 48 to a bracket 49 fixedly secured to and extending upwardly and rearwardly from the side of the frame member 3 as shown in Figure 1. The lower end of the lever 47 is connected by means of a link 50 with the upper end of an arm 51 fixedly secured to and extending upwardly from the shoe arch 43.

The inner end of the drag bar 44 is provided with a rearwardly bent portion 52 which extends longitudinally of the implement and is journaled in a sleeve 53 formed in a suitable casting 54 which is carried by and depends from the mower frame. For supporting the forward end of the casting 54 from the mower frame, a transversely extending bar or member 55 is fixedly secured to the frame members 2 and 11 by bolts 55' as shown in Figure 1, and the forward end of the casting is secured in suspended position to the member 55 in any suitable manner. The rear end of the casting 54 is suitably secured in suspended position to a transversely extending bar or member 56 which is bolted or otherwise secured to the frame members 2 and 9 rearwardly of the member 55. As shown in dotted lines in Figure 2, the vertical flange of the member 56 at the right hand end thereof is bent to bear against the vertical flange of the member 2 and is secured thereto by bolts 56'.

The outer end of the brace member 45 is provided with a rearwardly bent longitudinally extending portion by which it is pivotally connected to the shoe arch 43 in any suitable manner, and at its inner end said brace is threaded into a socket member 60 which, in turn, is connected by a horizontal pivot to a bracket 61 connected to the under side of the horizontal flange of the transverse frame member 8 by a bolt 61', as shown in Figure 2.

It will thus be seen that by journaling the rear end of the thrust bar 44 in the horizontally disposed longitudinally extending sleeve 53 and connecting the inner end of the brace member 45 to the frame bar 8 by a horizontally disposed substantially longitudinally extending pivot axis as described, the shoe arch, together with the cutter bar, is free to rise and fall with respect to the mower frame, as will be readily understood.

The cutter bar 40 may be lifted relatively to the frame of the mower through the agency of a lifting lever 70. This lever 70, which is operatively connected with the cutter bar 40 as hereinafter described, is journaled on a bar 72 of suitable circular cross section fixedly secured at its inner end to the brace member 10 of the mower frame by means of a bolt 73, as shown in Figure 2, and supported at its outer end by a bracket 75 fixed to and extending upwardly from the vertical side flange of the frame member 3, as shown in Figure 1. As shown in the latter figure, the upper end of the bracket 75 is formed arcuate in shape and is provided with one notch 76 adjacent the front edge of the bracket for receiving the latch 77 of the lever to hold the lever in its raised position, that is to say, the position to which it is moved to raise the cutter bar. Adjacent its rear edge the upper end of the bracket 75 is provided with a notch 78 for receiving the latch 77 and acting as a stop for limiting the rearward swinging of the lever 70 when it is moved to lower the cutter bar, as will be readily understood.

A suitable casting 71 is also journaled on the bar 72, and said casting is provided with a rearwardly and downwardly extending arm 80 which is connected by means of a link 81 to the shoe arch 43 as shown in Figure 1. A lost motion connection is provided between the casting 71 and the lever 70 whereby the casting is free to be rotated to lift the cutting mechanism without moving the lever 70, but nevertheless can be rotated in the direction to lift the cutting mechanism by the actuation of the lever 70. Any suitable lost motion connecting means for accomplishing the desired purpose may be employed. For counterbalancing the weight of the cutting mechanism, a tension spring 85 is provided, the rear end of said spring being connected to an arm 86 formed integral with and extending upwardly from the casting 71, while the forward end of said spring is connected with the frame member 8 in any suitable manner, as by hooking the forward end of the spring to a bracket 87 (see Figure 1) which is secured to the frame member 8.

The cutting mechanism may also be lifted to some extent by means of a foot lever 90 comprising a forward portion in the form of a bar 91 to which are bolted two bars 92, said latter bars diverging rearwardly and downwardly and having their rear ends pivotally connected between spaced pairs of lugs 93 and 94, respectively, formed integral with the casting 71 and extending upwardly therefrom as shown in Figure 2. The casting 71 is provided with two integrally formed lug members 71', as best shown in Figure 3, extending forwardly of the pivot connection between the bars 92 and the casting 71, said lug members carrying adjusting means in the form of bolts 95 which are positioned considerably in advance of the pivot journal between the casting 71 and the journal bar 72 and directly below the bars 92.

When downward pressure is applied to the foot lever 90, the bars 92 of the foot lever will contact with the bolts 95 and continued downward pressure on the foot lever will rotate the casting 71 on the journal bar 72, thereby moving the arm 80 of the casting and the link 81 which connects said arm with the shoe arch upwardly, thus raising the shoe arch and cutting mechanism, as will be readily understood. In the particular construction illustrated, the foot lever 90 can only be operated until it strikes the platform 96 of the tractor, and the position to which the cutter bar mechanism will be raised is only a semilifted position of such parts. If it is desired to lift the cutter bar to a higher elevation, the lever 70 must be used to accomplish said purpose. As the manner in which the cutting mechanism is supported from the frame and the lifting and tilting connections thereof are of conventional type, it is believed that the foregoing brief description thereof will suffice.

The sickle 41 is suitably supported in any appropriate manner for reciprocatory movement and is operated by a pitman 100 connected at one end in any suitable manner to the sickle and connected at its opposite end to a crank pin 101 carried by a fly-wheel 102 which is mounted on the forward end of a crank shaft 103 suitably journaled in bearings provided in a sleeve 104 in the casting 54. A sprocket wheel 105 is fixed to the rear end of the crank shaft 103 and is connected by means of a drive chain 106 with a sprocket wheel 107 mounted on a drive shaft 108 and driven thereby through a slip clutch 109. The drive shaft 108 is suitably journaled in bearings provided in a casting 110 mounted on a plate 111 supported from the mower frame on brackets 112 and 113.

Referring now more particularly to Figures 7 and 8, the bracket 112 is supported from the frame members 2 and 11 by a channel bar support 112a which is bolted to the member 2 by bolts 112b. The channel support 112a is notched out as shown at 112c to receive the frame member 11, a portion 112d of the web of the channel support 112a being bent to bear against the frame member 11 and being secured thereto by bolt means 112e. As shown in Figure 7, the bracket 113 is supported by and above the member 56, for that purpose being provided with downturned end flanges which are bolted to the member 56 by bolts 113a and 113b, respectively.

The drive shaft 108 is driven from the power take-off shaft 120 on the tractor through suitable connection therewith, including a universal joint 121, telescoping connection 122, universal joint 123 and a disconnect clutch 124. The function of this disconnect clutch 124 is to disconnect the power drive to the mower when the mower has been swung about the pivot 41 to a certain predetermined position with respect to the tractor.

Referring now particularly to Figures 4 and 5 which illustrate more in detail the disconnect clutch 124, it will be seen that it comprises an outer tubular member 126 slidably mounted over an inner cylindrical member 127. The inner member 127 is provided with a square internal boring 128 for receiving the squared rear end 129 of the power take-off shaft 120, the shaft being pinned to the cylindrical member 127 by means of a pin 130. The two arms 131 and 132 of the universal joint 123 are bolted to opposite sides of the outer tubular member 126 of the clutch.

Power is normally delivered from the power take-off shaft 120 to the member 126 through lugs 132 provided on the forward end thereof which engage in slots 133 provided therefor in an outwardly extending flange 134 on the forward end of the inner cylindrical member 127.

The tubular member 126 is held in this normal position with the lugs 132 engaging in the slots 133 by means of a spring plunger 135, which is disposed in aligned openings in the member 126, and a lug 136 carried by the member 126, as shown in Figure 5.

The inner end of the plunger 135 normally rests in a circumferential recess 137 provided in the outer surface of the cylindrical portion 127 as shown. Positioned in the open rear end of the cylindrical member 127 by means of a set screw 142 is a head member 143, the outer portion of which is of greater diameter than the cylindrical member and has its outer face of spheroidal contour as shown in Figure 5.

When the mower is swung rearwardly with respect to the tractor on the pivot bolt 21, the forward portions of arms 140 and 141 of the universal joint 123 are caused to rotate in a vertical plane disposed at an angle with respect to a transverse vertical plane, and when the mower is swung relatively to the tractor to a certain predetermined angular position, the forward end of one or the other of the arms 140 or 141 of the universal joint 123 will bear against the spheroidal outer surface of the head member 143.

During such rotation of the universal joint 123 the head member and inner cylindrical member 127 are held against longitudinal movement by the shaft 129, and as the mower swings beyond such predetermined position the arms 140 and 141 will ride up on such spheroidal outer surface of the head member 143, thus forcing the outer tubular member 126 and with it the universal joint 123 and the outer member of the telescopic connection 122 rearwardly, as will be readily understood. As a result of such rearward movement of the tubular member 126, the lugs 132 on the forward end of said member will be moved out of engagement with the slots 133 in the flange 134 of the inner member 127. As a consequence of the disconnection of the lugs 132 from the slots 133, the drive to the mower is interrupted, as will be readily understood. When the tubular portion 126 is thus drawn to this disconnected position, the latch 135 rides over the rib 144 between the circumferential recess 137 and the reduced end portion 145 of the member 127, whereby the clutch is held in disconnected position. To again re-engage the clutch after the mower has been moved back to its operative position, it is necessary to push the tubular member 136 forwardly with sufficient pressure to cause the latch 135 to ride over the rib 144 and into the recess 137, in which it will be held by the spring 135a of the latch, as will be readily understood. Various means may be provided for this purpose if desired.

In order that the mower may be returned to a proper operating position by the backing of the tractor after the mower has been swung to a rearward inoperative position as above described, a guide rod 150 is provided for guiding the mower back to a position where the latch 23 will automatically re-engage the pivot pin 19. The forward end of the guide rod 150 is pivotally connected by means of a vertically extending pivot bolt 151 to a bracket 152 which is pivoted on a horizontally disposed bolt 152a on a bracket 152b fixed to the upturned end 17 of the support 12 whereby said guide rod has horizontal swinging movement relatively to said support. As best shown in Figure 6, the guide rod 150 extends through a section of pipe 153 carried by a bracket 154 pivotally connected by means of a bolt 155 to the horizontal flange of the diagonal frame member 11, and when the latch 23 is released from the pivot pin 19 when the mower strikes an obstruction the mower will swing rearwardly with respect to the tractor. The pipe section 153 swings with the frame and moves rearwardly along the guide rod 150 while at the same time the guide rod 150 will swing laterally about its pivot connection with the member 12, as will be readily understood. The guide rod 150 is made sufficiently long so that it will not pull out of the pipe section 153 in any rearward inoperative position that the mower can assume.

When the mower is in its rearward position, the right hand front corner of the frame of the mower is supported by the rod 150 by means of the pipe section 153, this corner of the frame being thereby prevented from falling to the ground under its own weight, as will be readily appreciated. When the tractor is backed, to properly position the mower with respect thereto and reconnect the latch 23 with the pivot pin 19, the mower frame will be properly guided back to its proper position by the pipe section sliding along the rod 150 until the pivot pin 19 enters the recess 26 in the latch member 25.

Another important feature of the structure of the present application is the ease with which it may be connected to and disconnected from a tractor. To disconnect the mower from the tractor it is merely necessary to disconnect the supporting member 12 from the draw bar of the tractor by removing the connecting bolts 14, the removal of said bolts being facilitated by the provision of the wing nuts 15. After the removal of the bolts it is only necessary to drive the tractor forward to accomplish the disconnection thereof from the mower. In this connection, however, if no means were provided for preventing it, the forward end of the mower would drop to the ground when the tractor is driven away from it, and, therefore, to facilitate re-connection of the mower with the tractor means have been provided for supporting the front end of the mower in an elevated position, i. e., in about the position it normally occupies when connected with the tractor. This means comprises an arm 160 pivotally connected to the rearwardly extending frame member 3 by means of a bolt 161, as shown in Figure 1, and a member 162 pivotally connected to the rearwardly extending frame member 2 by means of a bolt 163, see Figure 2.

When the mower is connected to the tractor the arm 160 is normally carried in a substantially horizontal position alongside of the vertical flange of the frame member 3, but when the mower is to be disconnected from the tractor the arm 160 is swung down into a vertical position into engagement with the brace 45, as shown in dotted lines in Figure 1. The arm 160 is made long enough so that when the cutting mechanism is resting on the ground and the arm is in engagement with the brace 45, the right hand front corner of the mower frame will be held in the proper elevated position.

The member 162 at the forward left hand side of the mower frame is normally carried in inoperative position alongside of the frame member 2, but when desired it may be swung on its pivot connection 163 into a vertical position as shown in dotted lines in Figure 1. The member 162 is of such a length that when the lower end thereof rests on the ground, it holds the front left hand corner of the mower frame in proper elevated position. For holding the member 162 in a paper vertical position to support the mower frame a rod 162a is provided, said rod being pivotally connected at one end to the frame member 2 and at its free end is provided with a bent portion which may be inserted in an opening provided therefor in the member 162, as shown in dotted lines in Figure 1.

By reason of the arm 160 resting on the brace 45 as above described, the tilting lever 47 may be utilized to some extent to further facilitate connecting the mower to the tractor. By operating the tilting lever the frame will be rocked up and down about an axis defined by a line connecting the points of contact of the arm 162 and caster wheel 7 with the ground, as will be readily appreciated.

As is well understood by those familiar with commercial farm tractors, all of such tractors are not equipped with power shafts extending out from the tractor at the same point. For example, some tractors are equipped with a power shaft positioned at the side of the tractor as illustrated in the present application, while others are equipped with a power shaft positioned substantially in the longitudinal center line of the tractor. Another particularly advantageous feature of the present invention, therefore, is to provide a mower so constructed and arranged that it may be easily and quickly adapted for use in connection with either of such types of tractors.

In the construction illustrated, the mower is shown as connected to a tractor having its power shaft at the side, with the driving mechanism of the tractor operatively connected with such power shaft, and in order to accommodate the mower for use in connection with a tractor having a centrally disposed power shaft the supporting brackets or bars 112 and 113 which support the plate member 111 and the drive shaft 108 of the mower have been made relatively long, as shown in Figure 2, and provided with an extra set of bolt holes 170 whereby the plate member 111 may be shifted to the right as shown in Figure 2 to position the drive shaft 108 in a position approximately in line with the center of the tractor. As shown in Figure 7, the fly-wheel shaft 103 is positioned below the drive shaft 108 and equidistant from the two alternative positions of the shaft 108, one of which is shown in full lines and the other in dotted lines, whereby the chain 106 by which the fly-wheel shaft is driven from the shaft 108 is of the proper length for both positions of the shaft 108, and no adjustment thereof need be made when shifting the plate 111 and the shaft 108 from one position to another. Obviously, any other pair of optional positions may be accommodated, if desired.

While we have described in detail one preferred embodiment of our invention, it is to be understood that our invention is not to be limited to the specific details shown and described, but that, in fact, widely different means may be employed in the practice of the broader aspects of our invention.

What we claim, therefore, and desire to secure by Letters Patent is:

1. The combination with a tractor, of a mower comprising a frame and a cutting mechanism carried thereby and extending laterally therefrom, means connecting said frame with the tractor at laterally spaced points thereon, one of said connecting means including pivots providing for both vertical and lateral swinging movements of the frame relative to the tractor, and means connecting the other side of said frame with the tractor including a latch pivotally and releasably connecting the frame with the tractor and providing for the release of the frame therefrom when the cutting mechanism strikes an obstruction.

2. The combination with a tractor, of a mower comprising a frame and a cutting mechanism carried thereby and extending laterally therefrom, means connecting the side of said frame opposite said cutting mechanism with the tractor and including pivots providing for the vertical and horizontal swinging movements of the frame, and means connecting the side of said frame adjacent the cutting mechanism with the tractor and including a latch pivotally and releasably connecting the frame with the tractor.

3. The combination with a tractor, of a mower comprising a frame and a cutting mechanism carried by said frame and extending laterally therefrom, a pair of laterally spaced transversely aligned pivot means carried by the tractor, means connecting the side of said frame opposite said mechanism with one of said pivot means and providing for vertical and horizontal swinging movements of said frame with respect to the tractor, and latch mechanism carried by the mower frame and adapted to be releasably and pivotally connected with the other of said pivot means, said latch mechanism being releasable from said last pivot means when the cutting mechanism strikes an obstruction to permit the mower frame to swing about the vertical axis established by said first pivot means.

4. The combination with a tractor, of a mower comprising a frame and a cutting mechanism carried by said frame and extending laterally therefrom, a pair of laterally spaced transversely aligned pivot means carried by the tractor, means connecting the side of said frame opposite said mechanism with one of said pivot means and providing for vertical and horizontal swinging movements of said frame with respect to the tractor, latch mechanism carried by the mower frame and adapted to be releasably and pivotally connected with the other of said pivot means, said latch mechanism being releasable from said last pivot means when the cutting mechanism strikes an obstruction to permit the mower frame to swing about the vertical axis established by said first pivot means, and separate means for supporting the portion of the frame opposite said pivotal connections.

5. The combination with a tractor, of a mower comprising a frame and a cutting mechanism carried thereby and extending laterally therefrom, means serving as a universal joint for connecting the side of said frame opposite said cutting mechanism with the tractor, and latch means pivotally and releasably connecting the side of said frame adjacent said cutting mechanism with the tractor.

6. The combination with a tractor, of a mower comprising a frame and a cutting mechanism carried thereby and extending laterally therefrom, means serving as a universal joint for connecting the side of said frame opposite said cutting mechanism with the tractor, latch means pivotally and releasably connecting the side of said frame adjacent said cutting mechanism with the tractor, said universal joint and said last named means providing for the support of one end of the frame on the tractor, and separate means for supporting the other end of said frame.

7. The combination with a tractor, of a support rigidly connected to the tractor, a mower comprising a frame and a cutting mechanism carried by said frame and extending laterally therefrom, means serving as a universal joint connecting said frame with said support at the side opposite said cutting mechanism, means including a latch pivotally and releasably connecting said frame with said support at the side adjacent said cutting mechanism, said universal joint and said last named means providing means for supporting the forward end of the frame on the tractor, and means for supporting the rear of said frame on the ground whereby the mower will follow the contour of the ground independently of the tractor.

8. The combination with a tractor, of a support rigidly connected to the tractor, a mower comprising a frame and a cutting mechanism carried by said frame and extending laterally therefrom, a bracket pivotally connected to said support for vertical swinging movement with respect thereto about a transverse horizontal axis, said frame being pivotally connected to said bracket for horizontal swinging movement with respect thereto about a vertical axis, and means pivotally connecting said frame to said support for swinging movement with respect thereto about an axis substantially in alignment with said transverse horizontal axis, said means including a latch for releasably holding said frame in operating position, said latch being adapted to release when said cutting mechanism strikes an obstruction whereby said frame will swing relatively to the tractor about said vertical axis.

9. The combination with a tractor, of a support rigidly connected to the tractor, a mower comprising a frame and a cutting mechanism carried by said frame and extending laterally therefrom, means pivotally connecting said frame to said support for vertical swinging with respect to the tractor including a universal joint connecting said frame to said support, and means including a latch pivotally and releasably connecting said frame to said support at a point spaced from said universal joint, said latch normally holding said frame in operating position but releasable to permit said frame to swing about said universal joint in a horizontal plane when said cutting mechanism strikes an obstruction.

10. The combination with a tractor, of a support rigidly connected to the tractor, a mower comprising a frame and a cutting mechanism carried by said frame and extending laterally therefrom, a bracket pivotally connected to said support for vertical swinging movement with respect thereto about a transverse horizontal axis, said frame being pivotally connected to said bracket for horizontal swinging movement with respect thereto about a vertical axis, means pivotally connecting said frame to said support for swinging movement with respect thereto about an axis substantially in alignment with said transverse horizontal axis, said means including a latch for releasably holding said frame in operating position, said latch being adapted to release when said cutting mechanism strikes an obstruction whereby said frame will swing relatively to the tractor about said vertical axis, and a caster wheel for supporting the rear of said frame on the ground whereby said mower will follow the contour of the ground independently of the tractor.

11. The combination with a tractor, of a support rigidly connected to the tractor, a mower comprising a frame and a cutting mechanism carried by said frame and extending laterally therefrom, means pivotally connecting said frame to said support for vertical swinging with respect to the tractor including a universal joint connecting said frame to said support and means including a latch pivotally and releasably connecting said frame with said support at a point spaced from said universal joint, said latch normally holding said frame in operating position but releasable to permit said frame to swing about said universal joint in a horizontal plane when said cutting mechanism strikes an obstruction, and means for guiding said frame back to proper normal operating position with respect to the tractor for re-engaging said latch with said support.

12. The combination with a tractor, of a support rigidly connected to the tractor, a mower comprising a frame and a cutting mechanism carried by said frame and extending laterally therefrom, means pivotally connecting said frame to said support for vertical swinging with respect to the tractor including a universal joint connecting said frame to said support and means including a latch pivotally and releasably connecting said frame to said support at a point spaced from said universal joint, said latch normally holding said frame in operating position but releasable to permit said frame to swing about said universal joint in a horizontal plane when said cutting mechanism strikes an obstruction, and a guide member connected with said support and having sliding engagement with said frame.

13. The combination with a tractor, of a support rigidly connected to the tractor, a mower comprising a frame and a cutting mechanism carried by said frame and extending laterally therefrom, means pivotally connecting said frame to said support for vertical swinging with respect to the tractor about a substantially transverse axis and including a universal joint connecting said frame to said support and means including a latch pivotally and releasably connecting said frame to said support at a point spaced from said universal joint, said latch normally holding said frame in operating position but releasable to permit said frame to swing about said universal joint in a horizontal plane when said cutting mechanism strikes an obstruction, guide means pivotally connected with said support at a point in close proximity to said transverse axis about which said frame swings vertically with respect to the tractor, and means providing supporting engagement of said guide means with said frame.

14. The combination with a tractor, of a support rigidly connected to the tractor, a mower comprising a frame and a cutting mechanism carried by said frame and extending laterally therefrom, means pivotally connecting said frame to said support for vertical swinging with respect to the tractor about a substantially transverse axis and including a universal joint connecting said frame to said support and means including a latch pivotally and releasably connecting said frame to said support at a point spaced from said universal joint, said latch normally holding said frame in operating position but releasable to permit said frame to swing about said universal joint in a horizontal plane when said cutting mechanism strikes an obstruction, a guide member pivotally connected with said support at a point in close proximity to the axis about which said frame swings vertically with respect to the tractor, and means providing sliding engagement of said guide member with said frame.

15. A mower adapted to be connected with a tractor having a power take-off, comprising a frame, a drive shaft, a power transmitting connection for connecting said drive shaft with the power take-off of the tractor, a bracket on which said shaft is journaled, a support on said frame on which said bracket may be optionally fixed in either of two positions, one position locating said shaft to one side of the center line of the tractor and the other position locating said shaft substantially in line with the center line of the tractor, a crank shaft journaled on said frame, and means providing a driving connection between said crank shaft and said drive shaft in either optional position of said drive shaft.

16. A mower adapted to be connected with a tractor having a power take-off, comprising a frame, a drive shaft, a power transmitting connection for connecting said drive shaft with the power take-off of the tractor, a bracket on which said shaft is journaled, a support on said frame on which said bracket may be optionally fixed in either of two positions, one position locating said shaft to one side of the center line of the tractor and the other position locating said shaft substantially in line with the center line of the tractor, a crank shaft journaled on said frame, and a driving connection between said shafts, said crank shaft being disposed equidistant from the two optional positions of said drive shaft whereby the one driving connection is suitable for connecting said shafts when said drive shaft is in either position.

17. The combination with a tractor having a power take-off, of a mower pivotally connected with the tractor to swing vertically and horizontally with respect thereto, a latch normally holding said mower against horizontal swinging and releasable to permit such swinging when the cutting mechanism of the mower strikes an obstruction, means for driving the cutting mechanism of the mower from the power take-off of the tractor including a driven shaft on the mower, a universal joint connecting the driven shaft with the power take-off shaft of the tractor for permitting angular movements between the driven shaft and the power take-off, and a disconnect clutch operative to interrupt the drive from said power take-off to said driven shaft when said mower swings with respect to the tractor to an angle greater than the normal angular movements occurring between the mower and the tractor during the rising and falling of the mower relative to the tractor in operation.

18. A mower adapted to be connected with a tractor and comprising a frame, cutting mechanism carried thereby and extending laterally therefrom, means pivotally connecting the forward end of said frame with the tractor, ground engaging means for supporting the rear of said frame, and means connected with the frame and adapted to support the forward end thereof when detached from the tractor.

19. A mower adapted to be connected with a tractor and comprising a frame, cutting mechanism carried thereby and extending laterally therefrom at one side and including a ground engaging shoe, a transverse member pivotally connecting said cutting mechanism with the frame, releasable means adapted to connect the forward end of said frame with the tractor, separate ground engaging supporting means for the rear of said frame, and means adapted to be disposed between said transverse member and said frame for supporting at least a portion of the latter by said ground engaging shoe when the frame is detached from the tractor.

20. A mower adapted to be connected with a tractor and comprising a frame, cutting mechanism carried thereby and extending laterally therefrom at one side and including a ground engaging shoe, a transverse member pivotally connecting said cutting mechanism with the frame, releasable means adapted to connect the forward end of said frame with the tractor, separate ground engaging supporting means for the rear of said frame, means adapted to be disposed between said transverse member and one side of said frame for supporting a portion of the latter by said ground engaging shoe, and ground engaging means for supporting the other side of said frame when the frame is detached from the tractor.

21. The combination with a tractor, of a mower adapted to be propelled thereby comprising a rigid frame supported at its forward end on the tractor and pivotally connected to the tractor at two laterally spaced points, whereby the frame is held laterally rigid with respect to the tractor but is free to rise and fall relative thereto, caster wheel means supporting the rear end of the frame, a cutting mechanism including a sickle extending laterally to one side of the frame, a driving mechanism including a longitudinally extending crank shaft having a crank at its forward end, a pitman connecting said crank with said sickle, and a power connection through said driving mechanism and the power take-off shaft of the tractor including a longitudinally extending jack shaft having its rear end connected with the rear end of said crank shaft, and a telescopic connection having a universal joint at its forward end connected with the power take-off of the tractor and a universal joint at its rear end connected with the forward end of said jack shaft.

WILBUR J. COULTAS.
NOLAN D. COLVIN.

CERTIFICATE OF CORRECTION.

Patent No. 1,946,541.  February 13, 1934.

WILBUR J. COULTAS, ET AL.

It is hereby certified that error appears in the printed specification of the above numbered patent requiring correction as follows: Page 7, line 126, claim 21, for "through" read between; and that the said Letters Patent should be read with this correction therein that the same may conform to the record of the case in the Patent Office.

Signed and sealed this 20th day of March, A. D. 1934.

F. M. Hopkins (Seal)  Acting Commissioner of Patents.